July 26, 1927.

W. R. McGOWEN

VEHICLE BUMPER

Filed April 10. 1926

1,636,965

INVENTOR
William R. McGowen
By Archworth Martin,
Attorney.

Patented July 26, 1927.

1,636,965

UNITED STATES PATENT OFFICE.

WILLIAM R. McGOWEN, OF McKEES ROCKS, PENNSYLVANIA, ASSIGNOR TO UNITED STATES CHAIN & FORGING COMPANY, OF PITTSBURGH, PENNSYLVANIA, A CORPORATION OF DELAWARE.

VEHICLE BUMPER.

Application filed April 10, 1926. Serial No. 101,083.

My invention relates to vehicle bumpers and more particularly to means for attaching them to supporting brackets that are in turn secured to a vehicle.

The invention constitutes an improvement upon that described and claimed in my Patent No. 1,526,427, issued February 17, 1925, and has for its object the provision of a simplified and improved form of fitting by means of which the bumper may be secured to its supporting arms.

Figure 1:
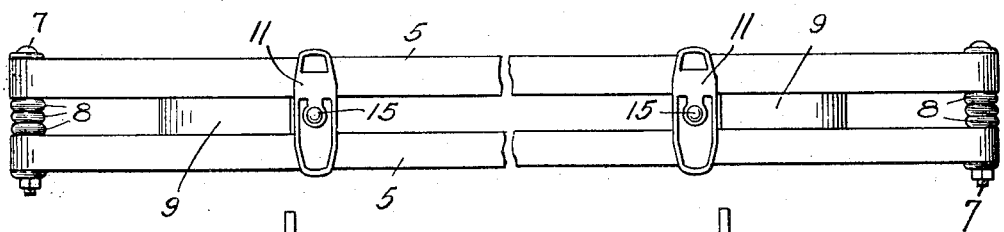
Figure 2:
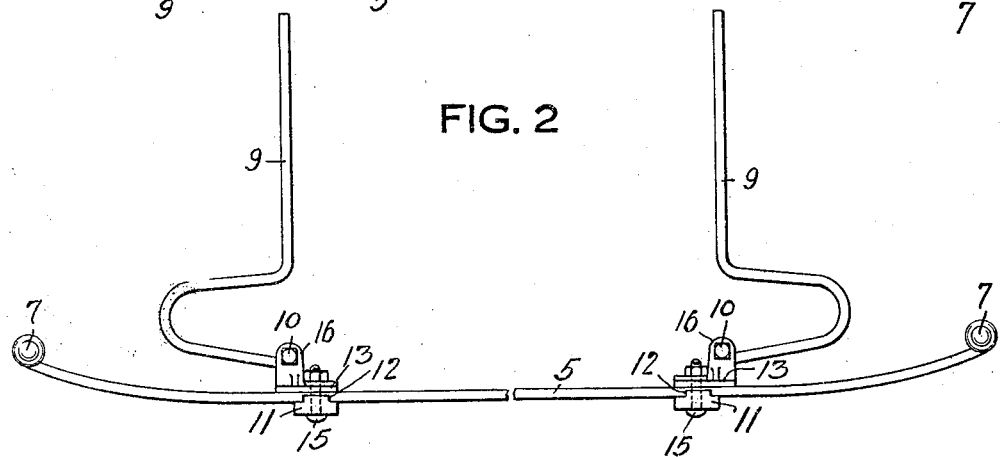
Figure 3:
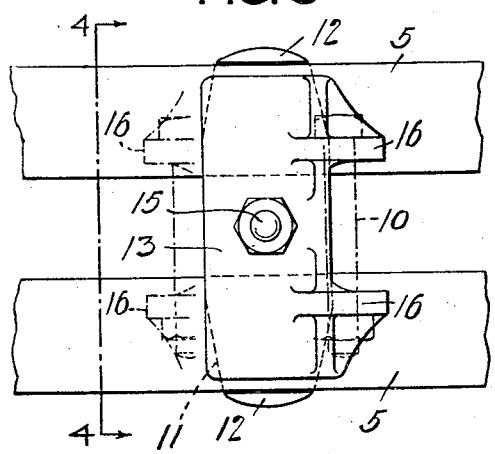

As shown in the accompanying drawing, Fig. 1 is a front elevational view of a bumper embodying my invention; Fig. 2 is a plan view thereof; Fig. 3 is a rear elevational view of a portion of the apparatus of Fig. 1, on an enlarged scale, and Fig. 4 is a sectional view of the apparatus of Fig. 3, looking from the left.

For the purpose of illustration, I have shown my apparatus as embodied in a two-bar bumper, but it will be apparent that any other suitable number of bars may be used. The bars 5 are preferably of spring steel and have eye portions formed at their outer ends through which bolts 7 extend, to tie such ends together. Spacing rings 8 are disposed between the ends of the bars and may take the form shown in my Patent No. 1,526,355, issued February 17, 1925.

The rear ends of the supporting arms 9 may be secured to a vehicle (not shown) in any suitable manner. The forward ends of the arms 9 are provided with eye portions through which bolts 10 extend.

Figure 4:
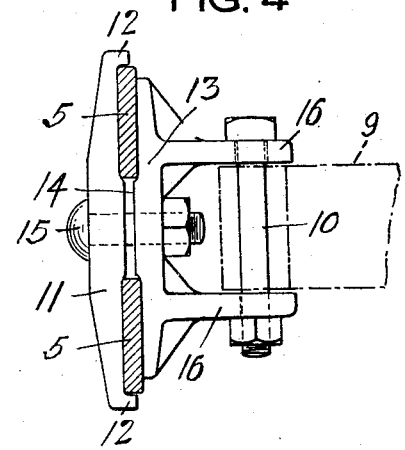

Face plates 11 are disposed against the faces of the bars 5 and are provided with flanged or hook portions 12 that engage the edges of the bars 5 as shown more clearly in Fig. 4. A rear plate or block 13 is disposed against the back faces of the bars 5 and is provided with a central boss 14 of less depth than the hooks 12, that serves as a spacer for the bars 5. The plates 11 and 13 are held in clamped engagement with the bars 5 by means of a bolt 15.

The plate 13 is provided with laterally offset portions that abut the rear faces of the bars 5 and have ears 16 that are provided with holes for the bolts 10 which serve to provide pivotal connection between the arms 9 and the bars 5. The ears 16 are offset laterally with respect to the plates 11 and 13 so that the distance between the pivot bolts 10 may be varied by reversing the position of the plates 13 to bring the ears 16 to the positions indicated in dotted lines in Fig. 3, and so that impacts upon the faces of the bars 5 will be transmitted directly through such offset portions to the fitting bolts 10, and hence relieve from shocks that portion of the plates 13 through which the bolts 15 extend.

This adjustment permits the adaptation of the bumper to automobile frames of two different widths, without disturbing to any substantial degree the position of the face plates 11. The face plates 11 are preferably decorative in appearance and it is desirable to maintain them at substantially symmetrical points between the ends of the bars. The positions of the plates 13 may be conveniently changed simply by loosening the nuts of bolts 15 to permit rotative movement of the plates about such bolts, without disturbing the setting of the face plates 11.

The arrangement also permits of convenient access to the nuts which hold the bolts 15 in position, as will be apparent from an inspection of Fig. 2, and the device possesses the further merit that only two clamping plates (11 and 13) are so formed as to require no additional spacing members for the bars.

I claim as my invention:

1. The combination with a pair of vertically spaced bumper bars, of a fitting comprising a face plate having flanges engaging an edge of each of the bars to hold the same against relative vertical movement in one direction, a backplate having a projection engaging the other edges of the said bars, the said projection being shorter in length than the thickness of said bars, an offset portion on said backplate in position to engage the rear surfaces of the bars, vertically spaced perforated lugs on said offset portion for supporting a pivot bolt, and a bolt extending between said bars and through said plates for holding the plates in clamping engagement with the bars.

2. The combination with a pair of vertically spaced bumper bars, of a fitting comprising a face plate having flanges engaging the remote edges of the bars to hold the same against relative vertical movement in one direction, a backplate having a projection extending between the adjacent edges of said bars, the said projection being shorter in length than the thickness of said bars, an offset portion on said backplate in position to engage the rear surfaces of the bars, vertically spaced perforated lugs on said offset portion for supporting a pivot bolt, and a bolt extending between said bars and through said plates for holding the plates in clamping engagement with the bars.

In testimony whereof I, the said WILLIAM R. McGOWEN, have hereunto set my hand.

WILLIAM R. McGOWEN.